United States Patent
Li et al.

(10) Patent No.: US 10,413,953 B2
(45) Date of Patent: Sep. 17, 2019

(54) STAMPING TO FORM A COMPOSITE STRUCTURE OF DISSIMILAR MATERIALS HAVING STRUCTURED FEATURES

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Michael K. Barnoski, Pacific Palisades, CA (US); Yongsheng Zhao, Fullerton, CA (US); Matthew Gean, Carmarillo, CA (US); Tewodros Mengesha, Camarillo, CA (US); Rand D. Dannenberg, Newbury Park, CA (US)

(73) Assignee: NANOPRECISION PRODUCTS, INC., Camarillo, CA (US)

( * ) Notice: Subject to any disclaimer, the term of this patent is extended or adjusted under 35 U.S.C. 154(b) by 0 days.

(21) Appl. No.: 15/726,324

(22) Filed: Oct. 5, 2017

(65) Prior Publication Data
US 2018/0290195 A1    Oct. 11, 2018

Related U.S. Application Data

(63) Continuation of application No. 14/714,211, filed on May 15, 2015, now Pat. No. 9,782,814, which is a (Continued)

(51) Int. Cl.
*G02B 6/36* (2006.01)
*B21D 22/02* (2006.01)
(Continued)

(52) U.S. Cl.
CPC ........... *B21D 22/02* (2013.01); *G02B 6/3616* (2013.01); *G02B 6/423* (2013.01); *G02B 6/4214* (2013.01);
(Continued)

(58) Field of Classification Search
CPC ........... G02B 6/4263; G02B 6/42; G02B 6/43
See application file for complete search history.

(56) References Cited

U.S. PATENT DOCUMENTS

5,037,179 A    8/1991   Bortolin et al.
5,155,787 A    10/1992  Carpenter et al.
(Continued)

FOREIGN PATENT DOCUMENTS

DE    3226025    1/1984
EP    0410181    1/1991
(Continued)

OTHER PUBLICATIONS

International Search Report of Counterpart PCT International Application No. PCT/US2015/031247.

*Primary Examiner* — Sung H Pak
*Assistant Examiner* — Hoang Q Tran
(74) *Attorney, Agent, or Firm* — Liu & Liu

(57) ABSTRACT

A composite structure includes a base and an auxiliary portion of dissimilar materials. The auxiliary portion is shaped by stamping. As the auxiliary portion is stamped, it interlocks with the base, and at the same time forming a desired structured feature on the auxiliary portion, such as a structured reflective surface, an alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a composite structure of two dissimilar materials associated with different properties for stamping different structured features.

19 Claims, 11 Drawing Sheets

Related U.S. Application Data continuation-in-part of application No. 14/695,008, filed on Apr. 23, 2015, now abandoned, which is a continuation-in-part of application No. 13/861,273, filed on Apr. 11, 2013, now abandoned, which is a continuation-in-part of application No. 13/786,448, filed on Mar. 5, 2013, now abandoned.

(60) Provisional application No. 61/994,094, filed on May 15, 2014, provisional application No. 61/699,125, filed on Sep. 10, 2012, provisional application No. 61/623,027, filed on Apr. 11, 2012, provisional application No. 61/606,885, filed on Mar. 5, 2012.

(51) Int. Cl.
*G02B 6/42* (2006.01)
*G02B 6/38* (2006.01)

(52) U.S. Cl.
CPC ......... *G02B 6/4243* (2013.01); *G02B 6/4248* (2013.01); *G02B 6/4292* (2013.01); *G02B 6/3696* (2013.01); *G02B 6/3833* (2013.01); *G02B 6/3839* (2013.01); *G02B 6/3877* (2013.01); *G02B 6/4246* (2013.01); *G02B 6/4249* (2013.01); *Y10T 29/49* (2015.01); *Y10T 29/49119* (2015.01)

(56) References Cited

U.S. PATENT DOCUMENTS

| | | | |
|---|---|---|---|
| 6,402,394 B1* | 6/2002 | Heinrich | G02B 6/4246 385/14 |
| 7,343,770 B2 | 3/2008 | Barnoski et al. | |
| 2011/0013866 A1* | 1/2011 | Rosenberg | G02B 6/0096 385/14 |
| 2013/0294732 A1 | 11/2013 | Li et al. | |

FOREIGN PATENT DOCUMENTS

| | | |
|---|---|---|
| JP | H07218739 | 8/1995 |
| JP | 2005164871 | 6/2005 |
| TW | 200635763 | 10/2006 |

* cited by examiner

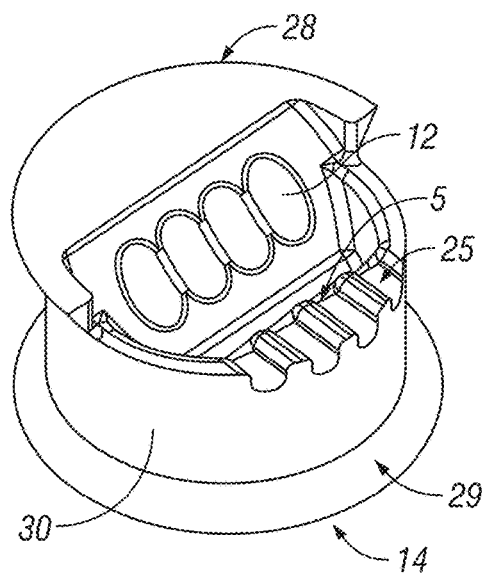
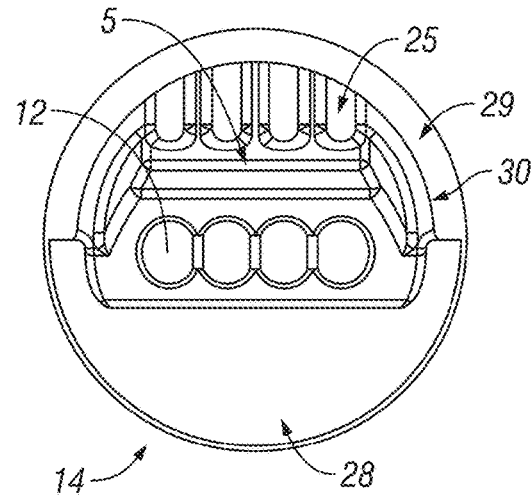
FIG. 2A  FIG. 2B
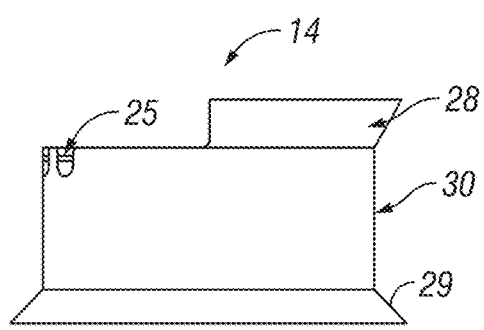
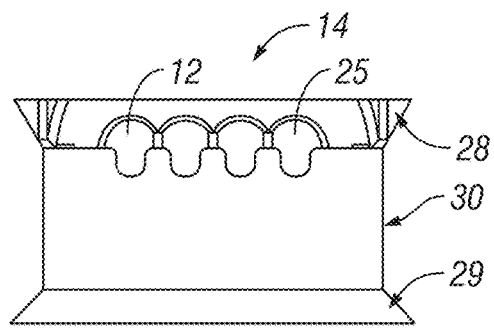
FIG. 2C  FIG. 2D

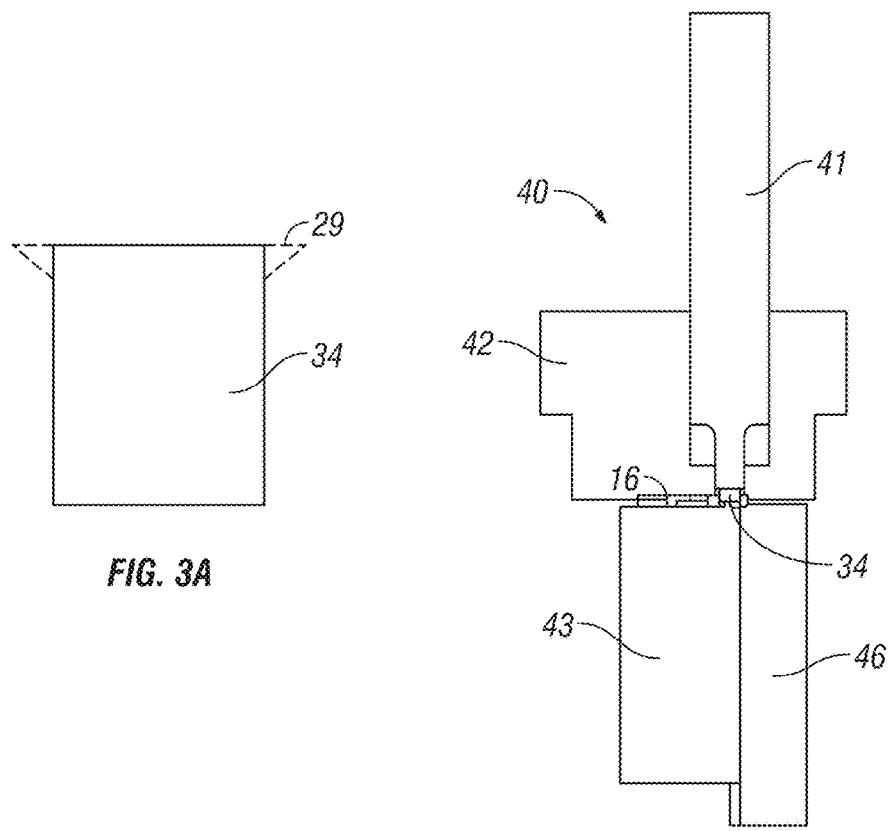
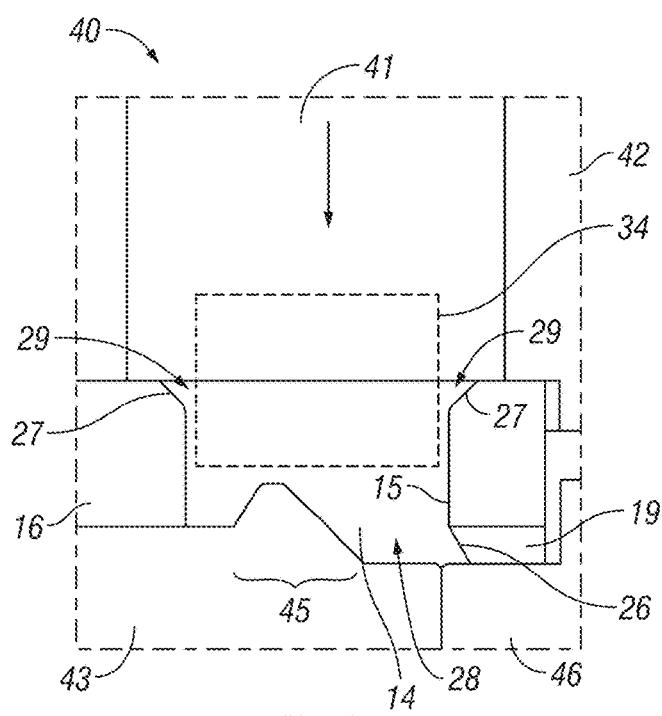
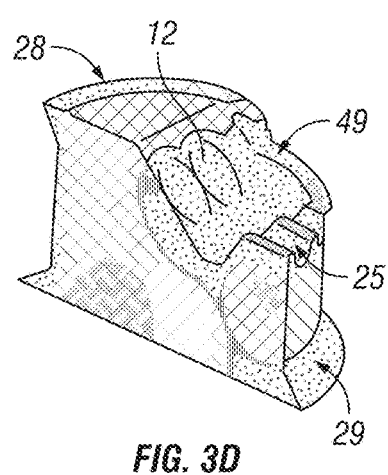
FIG. 3A
FIG. 3B
FIG. 3C
FIG. 3D

STAMPING TO FORM A COMPOSITE STRUCTURE OF DISSIMILAR MATERIALS HAVING STRUCTURED FEATURES

PRIORITY CLAIM

This application is a continuation of U.S. patent application Ser. No. 14/714,211 filed on May 15, 2015, which (1) claims the priority of U.S. Provisional Patent Application No. 61/994,094 filed on May 15, 2014, and (2) is a continuation-in-part of U.S. patent application Ser. No. 14/695,008 filed on Apr. 23, 2015, which is a continuation-in-part of U.S. patent application Ser. No. 13/861,273 filed on Apr. 11, 2013, which (a) claims the priority of U.S. Provisional Patent Application No. 61/623,027 filed on Apr. 11, 2012; (b) claims the priority of U.S. Provisional Patent Application No. 61/699,125 filed on Sep. 10, 2012; and (c) is a continuation-in-part of U.S. patent application Ser. No. 13/786,448 filed on Mar. 5, 2013, which claims the priority of U.S. Provisional Patent Application No. 61/606,885 filed on Mar. 5, 2012. These applications are fully incorporated by reference as if fully set forth herein. All publications noted below are fully incorporated by reference as if fully set forth herein.

BACKGROUND OF THE INVENTION

Field of the Invention

The present invention relates to precision stamping, in particular precision stamping to produce devices for use in connection with optical signal transmissions, and more particularly to precision stamping to produce devices for routing optical data signals.

Description of Related Art

The Assignee of the present invention, nanoPrecision Products, Inc., developed various proprietary devices used in connection with optical data transmission. For example, US2013/0322818A1 discloses an optical coupling device having a stamped structured surface for routing optical data signals, in particular an optical coupling device for routing optical signals, including a base; a structured surface defined on the base, wherein the structured surface has a surface profile that reshapes and/or reflect an incident light; and an alignment structure defined on the base, configured with a surface feature to facilitate positioning an optical component on the base in optical alignment with the structured surface to allow light to be transmitted along a defined path between the structured surface and the optical component, wherein the structured surface and the alignment structure are integrally defined on the base by stamping a malleable material of the base.

US2013/0294732A1 further discloses a hermetic optical fiber alignment assembly having an integrated optical element, in particular a hermetic optical fiber alignment assembly including a ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping.

U.S. patent application Ser. No. 14/695,008 further discloses an optical coupling device for routing optical signals for use in an optical communications module, in particular an optical coupling device in which defined on a base are a structured surface having a surface profile that reshapes and/or reflect an incident light, and an alignment structure defined on the base, configured with a surface feature to facilitate positioning an optical component on the base in optical alignment with the structured surface to allow light to be transmitted along a defined path between the structured surface and the optical component. The structured surface and the alignment structure are integrally defined on the base by stamping a malleable material of the base. The alignment structure facilitates passive alignment of the optical component on the base in optical alignment with the structured surface to allow light to be transmitted along a defined path between the structured surface and the optical component. The structured surface has a reflective surface profile, which reflects and/or reshape incident light.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a bulk material (e.g., a metal blank), to form the final surface features at tight (i.e., small) tolerances, including the reflective surfaces having a desired geometry in precise alignment with the other defined surface features.

Heretofore, the bulk material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

What is needed is an improved stamping process to produce devices with improved structural characteristics, functionalities, performances, reliability and manufacturability, at reduced costs.

SUMMARY OF THE INVENTION

The present invention further improves over the earlier stamping processes, by providing a composite structure that is precision stamped to form structured features (e.g., micro features), and more particularly devices having such structured features for use in connection with optical signal transmissions (including optical transmissions for micro electro-mechanical systems (MEMS) such as sensors).

According to the present invention, the composite structure comprises at least two dissimilar materials having one or more dissimilar properties, including without limitations chemical, physical, thermal, electrical, structural etc. properties, which may be optimized to enhance the functionalities of the structured features to be defined by these dissimilar materials. In particular, the composite structure comprises a body having a base comprising a base material and at least an auxiliary portion comprising at least a dissimilar auxiliary material that is paired or complementary to the base material. The auxiliary portion is coupled to the base. At least the auxiliary material of the auxiliary portion is shaped by stamping to form at least one structured feature that takes advantage of the properties of the auxiliary material (e.g., a light reflective surface feature and/or an alignment feature for a light guide or a light source/receiver). The base may also be shaped to define different structured feature(s) that take advantage of the properties of the base material.

In the composite structure, the dissimilar materials are distinctly present at different portions of the composite structure (i.e., at the base and auxiliary portion), thus exhibiting different properties of the respective dissimilar materials at different portions of the composite structure. Accordingly, in the context of the present invention, the auxiliary material is structurally coupled or attached to the base material to define a composite structure having the different materials remaining substantially distinct in bulk at different parts of the composite structure (ignoring any possible slight compounding/alloying present at a molecular level near the surfaces at the interface of the two different materials), in contrast to a structure in which, in bulk, constitutes a matrix based composite, a compound, an alloy and/or a solid solution of two of more dissimilar materials.

The base may provide a bulk support body on which the auxiliary portion is coupled. At least the auxiliary portion is stamped to define one or more structured features. In addition or in the alternate, the base may include structured features pre-defined thereon (e.g., by stamping) prior to coupling/stamping the auxiliary portion. In addition, a final stamping step may be undertaken with respect to the auxiliary material and/or the base material to obtain the desired finish, geometry and dimension of the structured feature at the auxiliary portion and/or the base.

In one embodiment, at least a dissimilar portion having an auxiliary material is coated onto at least part of the base. In another embodiment, the dissimilar portion may be attached to the base by other means (e.g., bonding, welding, riveting, etc.)

In another embodiment, at least one dissimilar auxiliary portion is coupled to the base by stamping. The auxiliary material may be fused to the base material under pressure from stamping the dissimilar material onto the base material; this is possible when the base portion and auxiliary portion have similar chemical composition (e.g. two aluminum alloys). Alternatively, the auxiliary material is structurally interlocked to the base material by stamping. In one embodiment, the auxiliary material is configured in the form of an insert, which is disposed in an opening in the base. The insert is stamped, creating an interlocking structure (e.g., a plug or a rivet-like interlocking structure) with respect to the base, and at the same time forming a desired structured feature on the insert.

The auxiliary material is chosen to be malleable for shaping by stamping. The base material may also be chosen to be malleable for shaping by stamping. In one embodiment, the auxiliary material is chosen to be relatively more malleable/ductile than the base material, to obtain the desired geometries, dimensions and/or finishes of critical features (e.g., a high optical reflective surface) at the auxiliary portion.

In one embodiment of the present invention, the base may be shaped (e.g., by stamping) to define structured feature(s) having relatively less critical dimensions, geometries and finishes based on relatively larger tolerances, and the auxiliary portion is shaped to define structured feature(s) having relatively more critical dimensions, geometries and/or finishes based on relatively smaller tolerances. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances.

In a further embodiment, the auxiliary portion (e.g., in the form of a plug or rivet) comprises a composite structure comprising at least two dissimilar auxiliary materials (e.g., a bi-metallic material) associated with different properties for stamping different structured features.

In one embodiment, an optical bench and/or an optical coupling device can be formed by stamping to form a composite structure as above. The auxiliary portion is shaped to define a structured reflective surface, and further structured features for aligning the end portions of the optical fibers with respect to the structured reflective surfaces. The auxiliary portion may comprise a first type of auxiliary material for stamping the structured reflective surface and a dissimilar second type of auxiliary material for stamping the structured features for alignment. The base is shaped to define relatively less dimensionally critical structured features, such as grooves for retaining optical fibers.

The composite structure of the present invention may include the following: (a) a metal auxiliary material and a metal base material; (b) a metal auxiliary material and a non-metal base material; and (c) a non-metal auxiliary material and a metal base material.

The present invention can be implemented to precisely form micro structured features in various devices, such as those disclosed in the patent documents assigned to nanoPrecision Products, Inc. which have been discussed in the Background section herein. The present invention can be implemented to produce optical subassemblies and stamped optical benches having structured features that achieve or exceed the functionalities of silicon optical benches discussed, for example, in US2003/223131A1; U.S. Pat. Nos. 6,869,231; 8,103,140; and 8,168,939.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 2A to 2D illustrate various views of an auxiliary portion in accordance with one embodiment of the present invention.

FIG. 3A is a schematic representation of an insert for forming an auxiliary portion by stamping; FIG. 3B schematic illustrates part of a stamping tool in accordance with one embodiment of the present invention; FIG. 3C is an enlarged view of the contact region in FIG. 3B; FIG. 3D is a simulation view of plastic strain in the auxiliary portion after being subjected to stamping operation.

DETAILED DESCRIPTION OF THE PREFERRED EMBODIMENTS

Figure 1A:
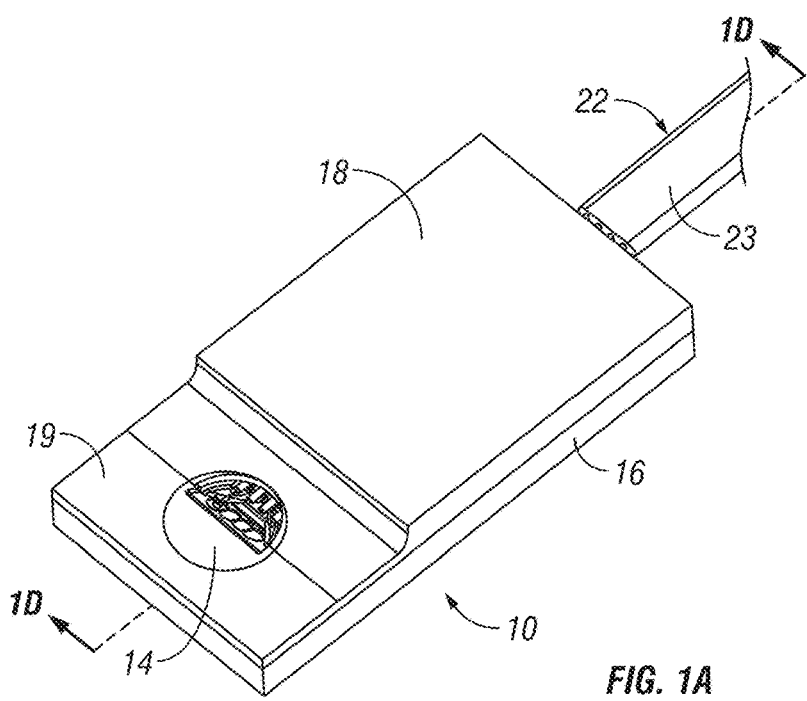
FIG. 1A illustrates an optical coupling device having a stamped optical bench having a composite structure in accordance with one embodiment of the present invention.
Figure 1B:
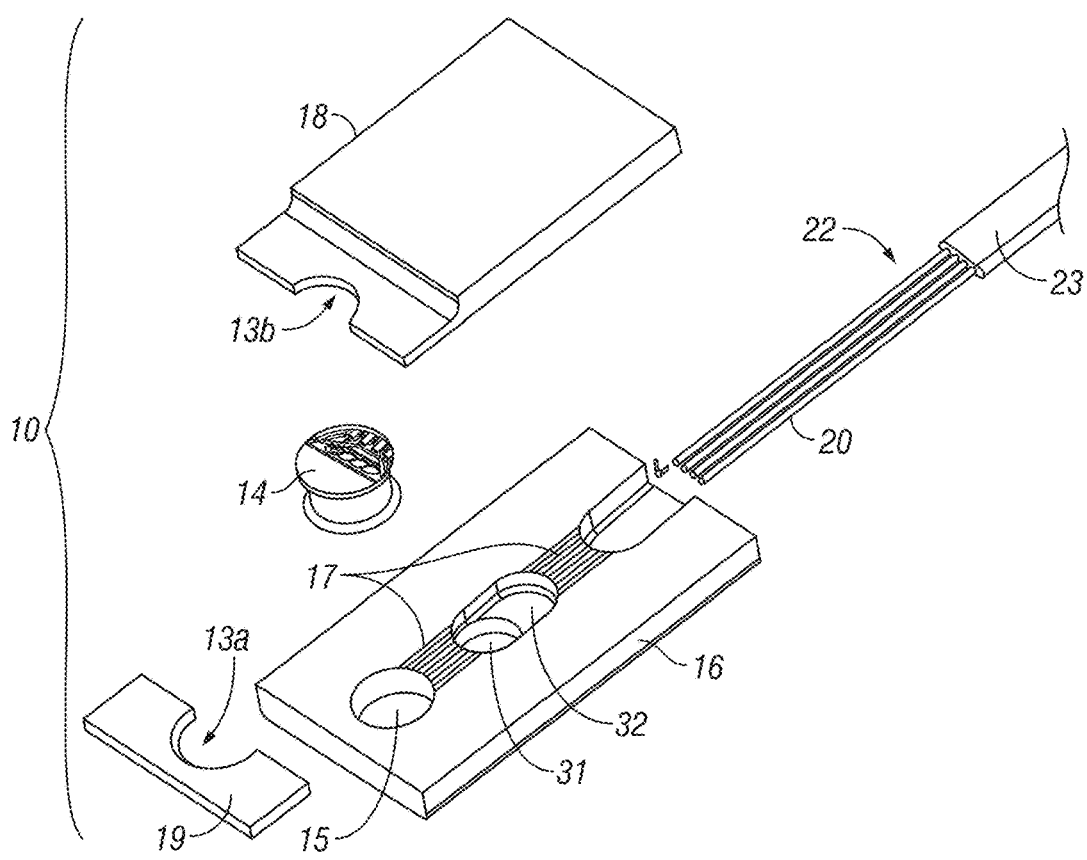
FIG. 1B is an exploded view thereof.
Figure 1C:
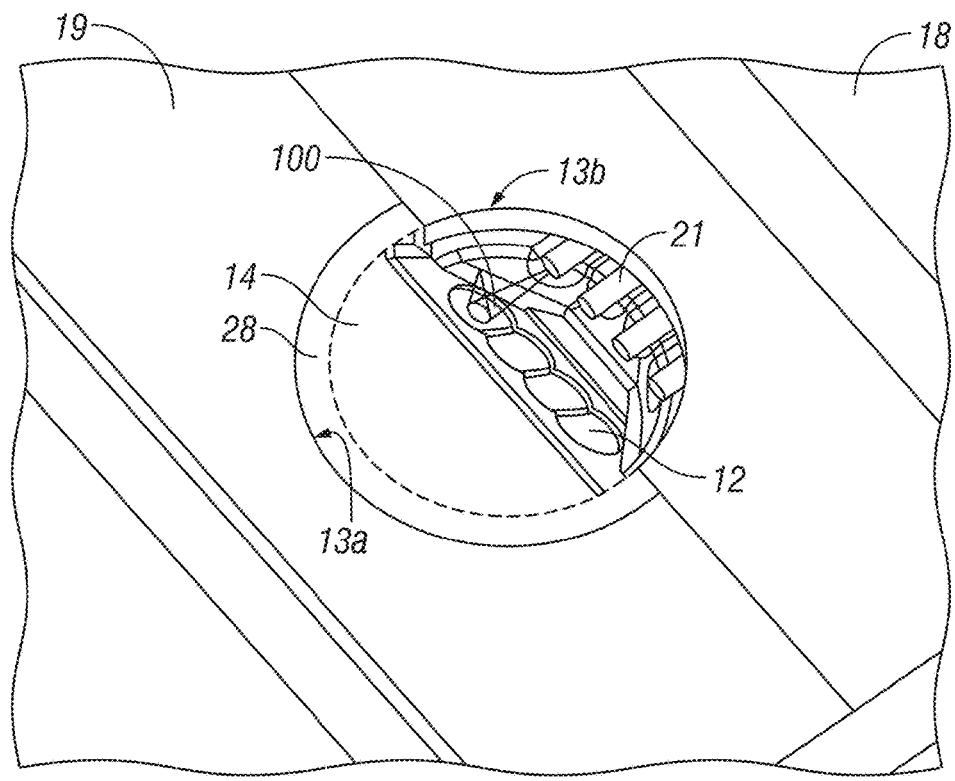
FIG. 1C is an enlarged view of the region of the auxiliary portion in FIG. 1B.
Figure 1D:
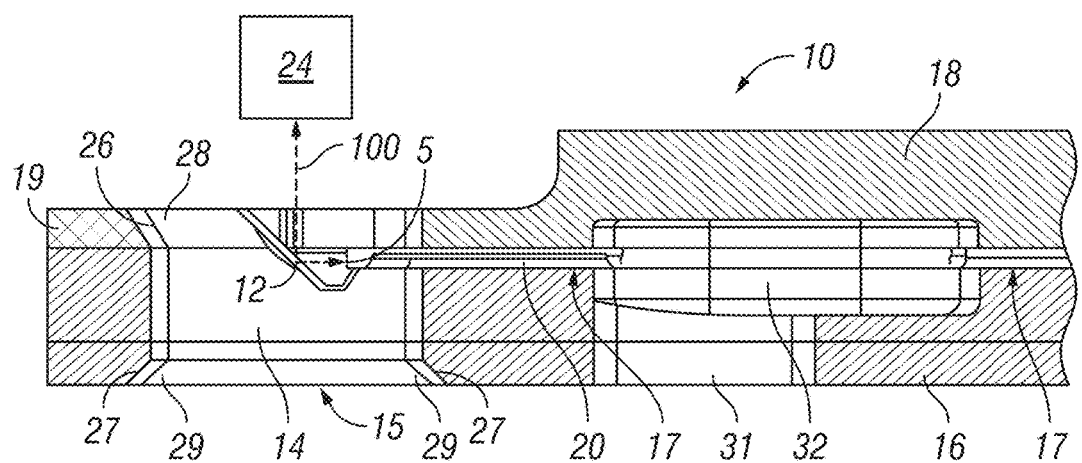
FIG. 1D is a sectional view taken alone line 1D-1D in FIG. 1A.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention further improves over the earlier stamping processes, by providing a composite structure that is precision stamped to form structured features, and more particularly devices having such structured features for use in connection with optical signal transmissions.

The concept of the present invention will be discussed with reference to an example of an optical coupling device for use to physically and optically coupling an input/output end of an optical component (e.g., an optical fiber) for routing optical signals. The present invention may be applied to form structures and parts used in other fields.

In the example discussed below, the coupling device is implemented with a stamped reflective surface for routing/redirecting optical signals from/to an external transmitter (Tx)/receiver (Rx) to/from an optical fiber. The structures of the optical coupling devices discussed below redirect light in similar fashion as the structures disclosed in connection with the optical coupling device in, for example, US2013/0294732A1. The present invention however adopts a different approach to defining the structured features associated with redirecting light (which may include structured reflective surfaces and associated alignment features), by implementing the inventive composite structures and associated stamping processes to define the structured features in the devices.

FIGS. 1A-1D illustrate a coupling device 10 for use in connection with an optical component in the form of optical fibers. The optical fiber cable 22 has four optical fibers 20 protected by protective buffer and jacket layers 23. The coupling device 10 includes an auxiliary portion 14, a base 16, a cover 18, and a spacer 19. The base 16 defines structured features including open grooves 17 for retaining bare sections of optical fibers 20 (having cladding exposed, without protective buffer and jacket layers 23), and a through-hole 15 for accommodating the auxiliary portion 14. An additional through-hole 31 and a pocket 32 is define in central part of the base 16, to accommodate a sealing material (e.g., a glass based sealant to provide a hermetical seal). Opposing edges of the spacer 19 and the cover 18 define complementary semi-circular cutouts 15a and 15b to form a circular opening corresponding to the cylindrical through-hole 15 on the base 16. A chamfer 26 is provided along the top edge of the cutout 15a, and a chamfer 27 is provided at the bottom of the through-hole 15 (in the orientation of the view of FIG. 1D). The purpose of these chamfers is to provide for a rivet-like interlocking structure with the flanges 28 and 29 of the auxiliary portion 14, which will be further explained below in connection with the stamping process. The surface of the cover 18 opposing to the base 16 may include open grooves (not shown), which complements the grooves 17 on the base 16 to securely retain the optical fibers 20. The cover 18 may have a plain opposing surface without such grooves if the grooves 17 on the base 16 are deep enough to completely receive the optical fiber 20.

The auxiliary portion 14 is shown more clearly in FIGS. 2A-2D. The auxiliary portion 14 defines structured features on the generally cylindrical body 30, including several stamped structured reflective surfaces 12 (i.e., four reflectors) having a plane inclined at an angle relative to the greater plane of the base 16. Each structured reflective surface 12 may have a flat, concave or convex surface profile and/or possess optical characteristics corresponding to at least one of the following equivalent optical element: mirror, focusing lens, diverging lens, diffraction grating, or a combination of the foregoing. The structure reflective surface 12 may have a compound profile defining more than one region corresponding to a different equivalent optical element (e.g., a central region that is focusing surrounded by an annular region that is diverging). In one embodiment, the structure reflective surfaces 12 may have a concave aspherical reflective surface profile, which serves both functions of reflecting and reshaping (e.g., collimating or focusing) a diverging incident light, without requiring a lens. Accordingly, each structured reflective surface 12 functions as an optical element that directs light to/from an external optical component 24, by reflection from/to the output/input end 21 of the optical fiber 20, along a defined optical path 100 (schematically shown in FIGS. 1C and 1D) that is aligned to the optical axis of the various optical components and elements (i.e., optical fibers 20, structured reflective surfaces 12, and external optical component 24). The external optical component 24 may include a light source (e.g., VCSEL) in a transmitter (Tx), a light sensor (e.g., photodiode) in a receiver (Rx), or both light source and sensor in a transceiver (Tx/Rx).

As more clearly shown in FIGS. 2A-2D, the structured features defined on the auxiliary portion 14 further include a structure defining several short open grooves 25 defined at a portion along an edge of the body 30, which are sized to receive and located to precisely position the end section 21 of the optical fibers 20 in alignment with respect to the structured reflective surfaces 12. The structured features also include shoulders 5, which define stops against which part of the edge of the end 21 of each optical fiber 20 is butted. The short grooves 25 and the shoulders 5 precisely position and align the ends 21 of the optical fibers 20 with respect to the structured reflective surfaces 12 along the optical path 100. The end face (input/output end) of each optical fibers 20 is maintained at a pre-defined distance with respect to a corresponding structured reflective surface 12.

It is noted that the auxiliary portion 14 shown in FIGS. 1A-1D and 2A-2D is in a state that is post coupling to the base 16. Hence, the auxiliary portion 14 is illustrated to include the flange 28 (and flange 29) that results from stamping the auxiliary portion 14 as further discussed below. Referring to FIG. 2C, the flange 28 extends from a raised portion at one side of the body 30. This raised side of the body provides additional height in the body structure to accommodate the structured reflective surfaces 12. This additional height is accommodated by the spacer 19. While the figures illustrate the spacer 19 to be a separate piece, it may be an integral part of the base 16. Alternatively, the spacer 19 may be an integral part of the cover 18.

In accordance with the present invention, the optical coupling device 10 is represented by a composite structure that comprises at least two dissimilar materials having one or more dissimilar properties, including without limitations chemical, physical, thermal, electrical, structural etc. properties, which may be optimized to enhance the functionalities of the structured features to be defined by these dissimilar materials. In particular, the composite structure of the body of the optical coupling device 10 has a base 16 comprising a base material and an auxiliary portion 14 comprising at least a dissimilar auxiliary material that is paired or complementary to the base material. The auxiliary portion 14 is coupled/attached to the base 16 to form the composite structure. At least the auxiliary material of the auxiliary portion 14 is shaped by stamping to form at least one structured feature (e.g., a structured reflective surface 12) that takes advantage of the properties of the auxiliary material and/or an alignment feature (e.g., grooves) for a light guide (e.g., an optical fiber 20). The base 16 may also be shaped to define additional structured feature(s) (e.g., grooves 17 for retaining optical fibers 20) that separately take advantage of the different properties of the base material.

In the composite structure, the dissimilar materials are distinctly present at different portions of the composite structure (i.e., at the base and auxiliary portion), thus exhibiting different properties of the respective dissimilar materials at different portions of the composite structure. Accordingly, in the context of the present invention, the auxiliary material is structurally coupled or attached to the base material to define a composite structure having the different materials remaining substantially distinct in bulk at different parts of the composite structure, in contrast to a structure in which, in bulk, constitutes a matrix based composite, a compound, an alloy and/or a solid solution of two of more dissimilar materials.

The base 16 thus provide a bulk support body on which the auxiliary portion 14 is coupled. In accordance with the present invention, at least the auxiliary portion 14 is stamped to define one or more structured features. In addition or in the alternate, the base 16 may include structured features pre-defined thereon (e.g., grooves 17 by stamping) prior to coupling/stamping the auxiliary portion 14. In addition, a final stamping step may be undertaken with respect to the auxiliary material and/or the base material to obtain the final desired finish, geometry and dimension of the structured feature at the auxiliary portion and/or the base. The base 16 may be shaped (e.g., by stamping) to define structured feature(s) having relatively less critical dimensions, geometries and finishes based on relatively larger tolerances, and the auxiliary portion 14 is shaped to define structured feature(s) having relatively more critical dimensions, geometries and/or finishes based on relatively smaller tolerances (e.g., a tolerance less than 1000 nm for purpose of optical data signal transmission). With this approach, relatively less critical structured features can be shaped on the bulk of the base 16 with less effort to maintain a relatively larger tolerance, while the relatively more critical structured features on the auxiliary portion 14 are more precisely shaped with further considerations to define dimensions, geometries and/or finishes at relatively smaller tolerances.

Essentially, for the optical coupling device 10, the base 16 and the auxiliary portion 14 together form a composite structure defining an optical bench 11 for aligning the optical fibers 20 with respect to the structured reflective surfaces 12, with the auxiliary portion 14 defining the structured reflective surface 12 and the alignment grooves 25 with relatively more critical geometries, dimensions and/or finishes desired for aligning the optical fiber end sections 21 with respect to the structured reflective surfaces 12, and the base 16 includes a structure defining open grooves 17 with relatively less critical geometries, dimensions and/or finishes for retaining the bulk sections of the bare optical fibers 20 without optical alignment concern. By including the grooves 25 on the same, single structure that also defines the structured reflective surfaces 12, the alignment of the end sections 21 of the optical fibers 20 to the structured reflective surfaces 12 can be more precisely achieved with relatively smaller tolerances by a single final stamping to simultaneous define the final structure on a single part, as compared to trying to achieve similar alignment based on features defined on separate parts or structures. By forming the structure reflective surfaces 12 and the optical fiber alignment structure/grooves 25 simultaneously in a same, single final stamping operation, dimensional relationship of all features/components requiring (or play a role in providing) alignment on the same work piece/part can be maintained in the final stamping step. Further, the material for the auxiliary portion 14 may be chosen to possess a high reflective efficiency (e.g., pure Aluminum) that is desirable for the structured reflective surface 12 having high optical reflectance, and the dissimilar material for the base 16 may be chosen to possess properties desirable for the base 16, such as high rigidity, low coefficient of thermal expansion, etc.

The overall functional structures of the optical bench 11 (and bench 11' in FIGS. 4C and 4D) generally resemble the structures of some of the optical bench embodiments disclosed in nanoPrecision's earlier patent documents noted above (i.e., fiber alignment grooves aligned with structured reflective surfaces, and addition features to facilitate proper optical alignment). In the present invention, however, the optical benches are stamped with structured features on dissimilar materials, with certain structured features stamped on a material that is better suited for such features (e.g., structured features that play a more critical role in optical alignment (e.g., structured reflective surfaces 12 and grooves 25), and a higher optical reflectance for the structured reflective surfaces 12, are being stamped on the auxiliary material of the auxiliary portion 14), and other structured features stamped on another material that is better suited for those features (e.g., structured features playing a less critical role but structurally stronger (e.g., stronger alignment grooves 17 being stamped on the base 16). This is a significant improvement over the prior embodiments in the earlier patent documents.

In one aspect of the present invention, the material of the auxiliary portion 14 is coupled to the dissimilar material of the base 14 at the same time the structured features on the auxiliary portion 14 are formed by stamping. In one embodiment, the auxiliary material is structurally interlocked to the base material by stamping, e.g., in a rivet-like manner as in the embodiments of FIGS. 1A-1D and 2A-2D. FIGS. 3A to 3C schematically illustrate the process of stamping to form a composite structure having a rivet-like interlocking structure, and at the same time forming the structured features of the auxiliary portion 14 illustrated in FIGS. 2A-2D.

Referring to FIG. 3A, the auxiliary material is configured in the form of a generally cylindrical slug or insert 34, which is sized to fit into the through-hole 15 in the base 16. A circular cylindrical insert 34 (and a generally circular cylindrical through-hole 15 in the base 16) is preferred over a rectangular cylinder, to reduce corner between the materials of the insert and the base to facilitate stamping. In an alternate embodiment, the cylindrical insert 34 may be pre-formed with a head 29' resembling a rivet, whereby the head 29' would eventually become the flange 29 (FIG. 2C) after stamping.

FIG. 3B schematically illustrates part of a stamping tool 40 (simplified to avoid obscuring the discussions herein), which includes a matching punch and die set to form the structured features of the auxiliary portion 14. FIG. 3C is an enlarged view of the contact region between the punch and die. A punch 41 is supported in a punch guide 42. In this case, the punch 41 has a blunt tip. A die 43 is configured with a surface profile 44 for forming the structured features in the auxiliary portion 14, as shown in FIG. 2A (i.e., structured reflective surfaces 12, shoulder 5, grooves 25, etc.). The top of the die 43 defines a contact surface profile 45 comprising generally "male" or convex surface features that are essentially the inverse of the structured features including the reflective surface 12, the shoulders 5 and the grooves 25. The surface profile 45 is designed with consideration of appropriate compensation for "springback" from stamping operations. The surface profile 44 of the die 43 conforms to the structured features to be stamped on the surface of the auxiliary portion 14. A flat die 46 is positioned adjacent the die 43, to support part of the work piece to be stamped and to contain the die 43 during stamping process.

For sake of simplicity, a preformed base 16 is positioned on the die 43, below the punch guide 42, with the through-hole 15 aligned with the tip of the punch 41. The spacer 19 is supported between the flat die 46 and the base 16 and may be joined to the base by a previous joining process like welding or gluing. The insert 34 is placed in the through-hole 15 in the base 16.

Referring to FIG. 3C, the insert 34 is represented by broken lines in a state prior to stamping operation. As the punch 41 strikes the insert 34 against the die 43, the insert 34 plastically deforms to fill the space defined between the punch 41, die 43 and the walls of through hole 15 in the base 16. The surface profile 45 of the die 43 forms complementary surface features on the underside of the insert 34, which now takes the shape of the auxiliary portion 14 shown in FIGS. 2A to 2D. The top side of the auxiliary portion 14 is generally flat, conforming to the blunt tip of the punch 41. The structured features of the auxiliary portion 14 are thus formed by this punching operation. At the same time, the material of the insert 34 fills the chamfers 26 and 27, forming flanges 28 and 29 against the chamfers 26 and 27, with the flange 28 interlocking the spacer 19 and the auxiliary portion 14 to the base 16. The auxiliary portion 14 resembles a rivet attached to the base 16. Accordingly, in a single stamping operation, the structured features of the auxiliary portion 14 are formed and the auxiliary portion 14 is securely coupled to the base 16 with a rivet-like structure. It is noted that given the base 16 is chosen to be made of a relatively harder material (at least with respect to stamping), stamping of the insert 34 to form the auxiliary portion 14 would not materially change the geometry of the base 16 (e.g., the through-hole 15). The lateral exterior body contour of the auxiliary portion 14 conforms to the contours of the through-hole, including the chamfers. Thus a single stamping operation would result in an auxiliary portion 14 having precisely defined overall body contours and features, in precisely defined relative positions. A composite structure is thus formed, with structured features defined at least on the auxiliary portion 14.

Instead of a punching operation with a single strike of the punch 41, it is conceivable that multiple strikes may be implemented to progressive pre-form certain features on the auxiliary portion 14, with a final strike to simultaneously define the final dimensions, geometries and/or finishes of the various structured features on the auxiliary portion 14. By forming the structure reflective surfaces 12 and the optical fiber alignment structure/grooves 25 simultaneously in a same, single final stamping operation, dimensional relationship of all features/components requiring (or play a role in) alignment on the same work piece/part can be maintained in the final stamping step.

FIG. 3D shows the result of software simulation of the plastic strain in the auxiliary portion 14 as a result of the stamping operation. As expected, higher plastic strain is present at high contact pressure regions, including the concave region 49 that includes the structured reflective surface 12 and groove 25, and at the flanges 28 and 29.

Figure 4A:
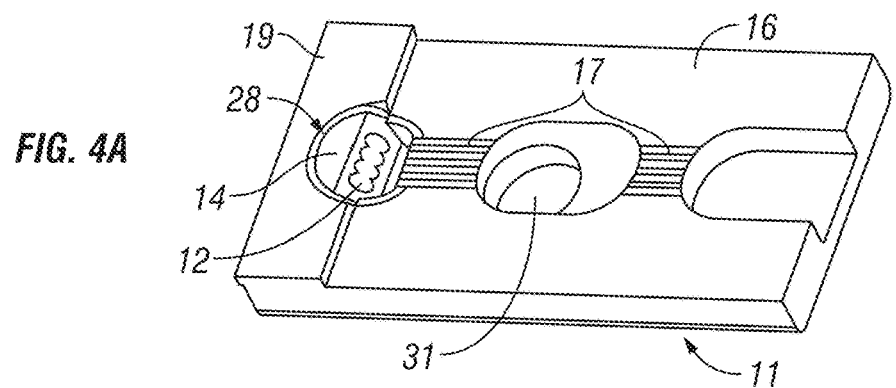
FIGS. 4A to 4B are various views of an optical bench formed in accordance with one embodiment of the present invention.
Figure 4B:
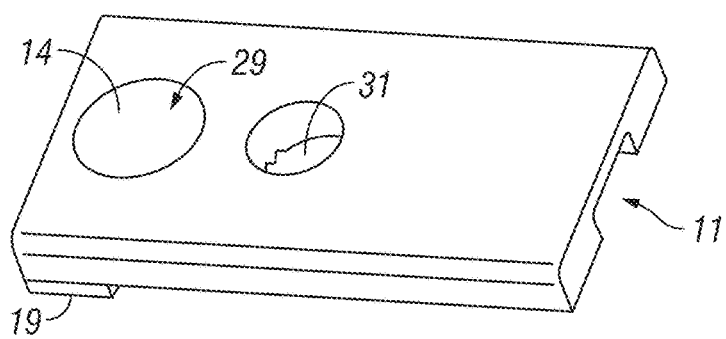
Figure 4C:
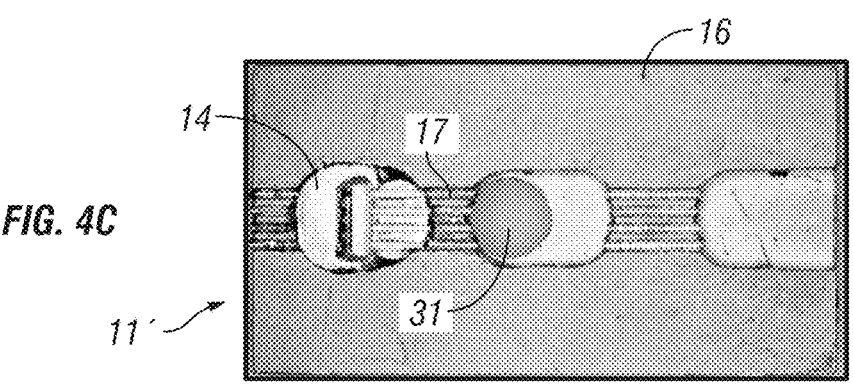
FIGS. 4C to 4D are various images of an optical bench formed in accordance with one embodiment of the present invention.
Figure 4D:
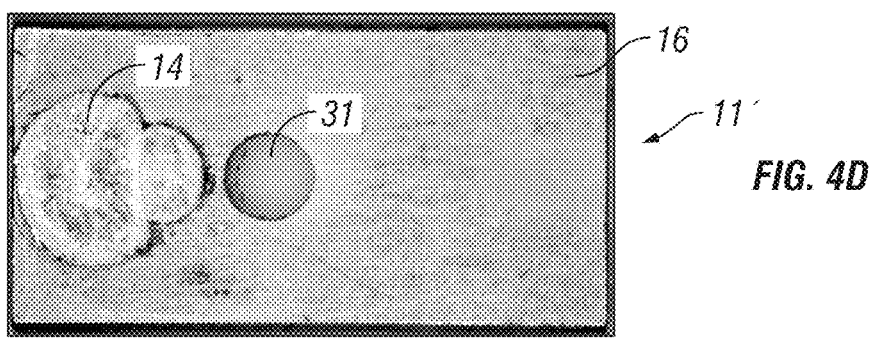

FIGS. 4A and 4B show the two sides of the optical bench 11 formed by the composite structure of the base 16 with the auxiliary portion 14 coupled thereto. In FIG. 4A, the auxiliary portion 14 is shown to include structured reflective surfaces 12 and grooves 25. Some of the structured features formed on the auxiliary portion 14 may be aligned with some of the structured features formed on the base 16. For example, the grooves 25 are aligned with the grooves 17 on the base 16. FIGS. 4C and 4D are images of a prototype optical bench 11' that had been subject to stamping operations.

The formation of impressions, i.e., the structured features, on the surface of the auxiliary portion 14 involves a process generally known as "coining". According to one embodiment of the present invention, the structured features of the auxiliary portion 14 may be formed by precision stamping a ductile or malleable material, preferably metal, such as pure Aluminum. Based on prior experimental results, it has been found that stamped structured reflective surfaces can achieve a peak-to-valley form error of less than 1 µm over a 1 mm diameter area. Surface roughness (Ra) based on scanning white light interferometry is on the order of 8 nm or better. The compression of the malleable material between the punch and die generates high contact pressure for a high reflective, mirror-quality surface.

A precision stamping process and apparatus has been disclosed in U.S. Pat. No. 7,343,770, which was commonly assigned to the assignee of the present invention. This patent is fully incorporated by reference as if fully set forth herein. The process and stamping system disclosed therein may be adapted to precision stamp the features of the optical bench 11 in the coupling device 10 of the present invention (including the structured features of the auxiliary portion 14 and the base 16 disclosed herein), which includes a composite structure as discussed above. The stamping process and system can produce parts with a tolerance of at least 1000 nm (i.e., a tolerance of 1000 nm or less/better). This system may be implemented to undertake various operations for stamping, such as forging, blanking, punching, coining, compression, bending, extruding, perforating, notching, etc.

The above disclosed open structure of the coupling device having the structured reflective surface and the fiber retention structure lends itself to mass production processes such as stamping, which are low cost, high throughput processes. In the discussions throughout herein, various details of stamping systems and processes not essential to an understanding of the inventive concept have been omitted.

Figure 5A:
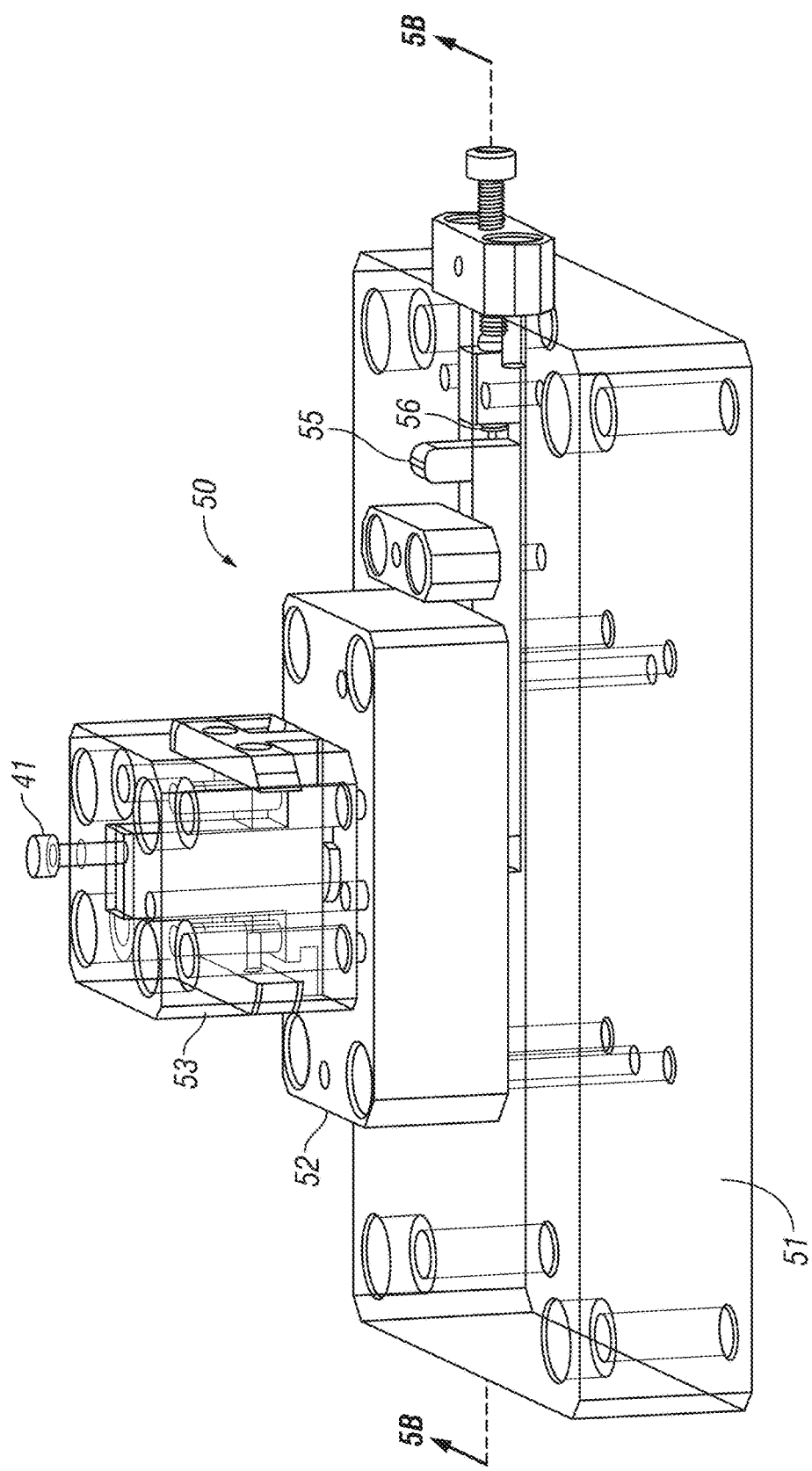
FIG. 5A schematic illustrates a stamping tool in accordance with one embodiment of the present invention.
Figure 5C:
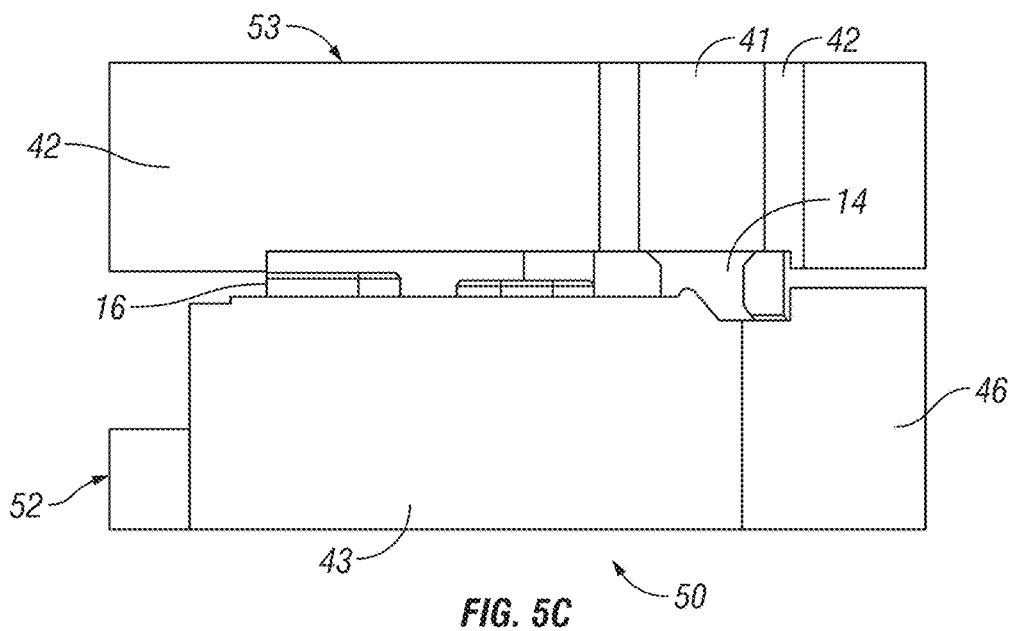
FIG. 5C is an enlarged view of the contact region in FIG. 5B.
Figure 5B:
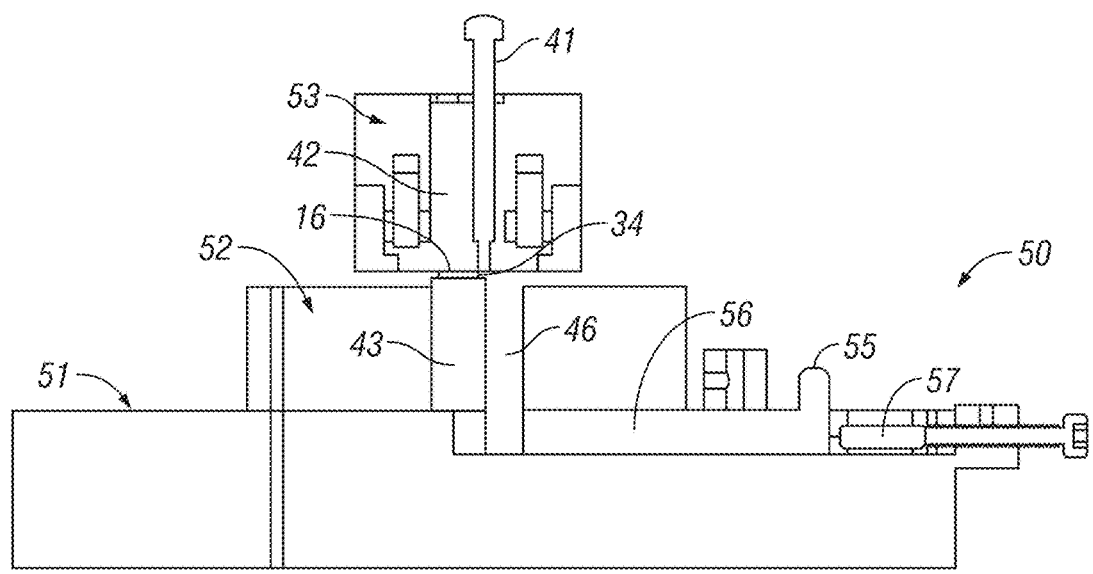
FIG. 5B is a section view taken along line 5B-5B in FIG. 5A.

FIGS. 5A to 5C illustrates an embodiment of a stamping tool 50, which incorporates underlying novel features of the stamping system disclosed in the U.S. Pat. No. 7,343,770, and which is configured to perform stamping operations to press a metal insert in a base to form the composite structure disclosed above. The stamping tool 50 includes a tool base 51, a die holder 52 attached to the tool base 51, a mask 53 above the die holder 52. This stamping tool 50 essentially incorporates the basic components of the stamping tool 40 shown in FIGS. 3A to 3C. Specifically, the die holder 52 supports the die 43 and flat die 46, and the mask 53 houses the punch guide 42 that guides the punch 41. In this embodiment, the mask 53 also houses a spring-loaded retainer 54 for the work piece (e.g., the base 16). The stamping tool 50 also includes a flat die height adjuster 55 having a wedge 56 movable by a spring plunger 57. FIG. 5C is an enlarged view of the contact region between the punch and the die.

In operation, the spring-loaded retainer 54 is retracted to place the work piece/base 16 and insert 34 under the punch 41. The height of the flat die 46 is adjusted to support the spacer 19 at the desired location, by turning the spring plunger to move the wedge 56 horizontally. After stamping operation, the spring-loaded retainer 54 is retracted to release the stamped piece (i.e., base 16 with auxiliary portion 16 coupled thereto).

The stamping tool 50 may be incorporated in a stamping system that may include a progressive die, which provide an effective way to convert raw coil stock material into a finished product with minimal handling. The part material feeds one progression for each press cycle. As material feeds from station to station in the die, it progressively works into a complete part.

Figure 6:
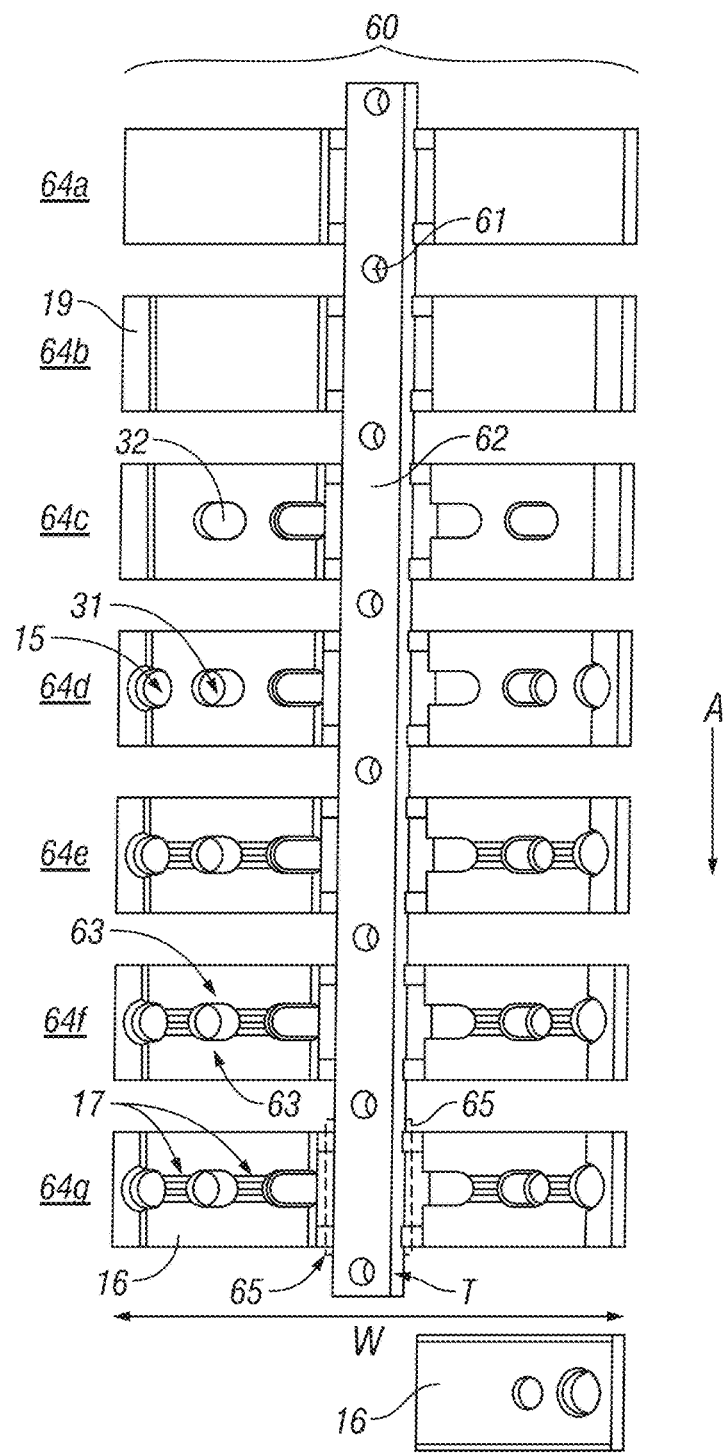
FIG. 6 is a perspective view of a strip of metal for stamping of optical benches in accordance with one embodiment of the present invention.

FIG. 6 schematically illustrates the stamping operations on a metal stock material which is in the form of a longitudinal flat ribbon or strip 60 of metal (equivalent to a series of connected blanks), having a chosen width W (e.g., 20 mm) and a chosen thickness T (e.g., 3 mm) that would provide the desired thickness of the base 16 of the embodiment of FIGS. 1A-1D. The material of the strip 60 may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The strip 60 has a series of indexing holes 61 formed along a spine 62 of the strip 60. The strip 60 is fed through a series of stamping stations/dies, subject to precision stamping operations to form the desired features of the base 16. The indexing holes 61 are used for indexing the strip 60 as it is fed through the stamping stations. The entire strip 60 may be progressively fed through a first stamping station before the entire strip 60 is progressively fed through a second stamping station, and so forth. Alternatively, the strip 60 may be fed continuously through a series of progressive stamping stations (or a progressive die). The features on the base 16 in the optical bench 11 may be progressively formed via a sequence of stamping operations, with the final geometry of the features being defined by a single stamping operation within the sequence, to simultaneously define the final geometries, dimensions and/or finishes of the surface features of the base 16.

As earlier noted in connection with the earlier embodiments, the precision stamping process and apparatus as disclosed in U.S. Pat. No. 7,343,770 (which was commonly assigned to the assignee of the present invention) could be adopted to stamp strip 60 to form the features of the base 16.

As shown in FIG. 6 a section of the strip 60 had been subject to stamping operations. A plurality of stamped sections 64 are defined along the strip 60. For the sake of simplicity, in the illustrated embodiment of FIG. 6, each stamped section 64 corresponds with an indexing hole 61 (in other words, the pitch of adjacent indexing holes 61 is the same as the pitch of adjacent sections 6). For purpose of illustration, the strip 60 is used to form the base 16 described in connection with FIGS. 1A-1D above (with the exception that the spacer 19 is now integral to the base 16 in the embodiment illustrated in FIG. 6). Specifically as illustrated, at each section 64, two bases 16 are being formed by stamping on either side of the spine 62.

Arrow A represents the direction of feed of the strip 60. Section 64g represents a "finished" stamped section at the end of the stamping cycles, at which the features of the base 16 have been finally formed by stamping. Given the direction of feed (arrow A). Section 64a represents the start of the stamping cycles. As shown in FIG. 6, two identical base 16 are simultaneously formed by stamping operations, wherein the two parts on either side of the spine 62 are mirror images of each other. This "two-up" configuration achieves certain advantages, namely it provides force symmetry along the central axis of the strip 60, thereby providing stability during stamping operations, which improves the integrity and precision of the stamping operations.

Specifically at section 64a, the outside boundary of the base is shaped (e.g., by a blanking operation). At sections 64b to 64c, surface features are progressive formed (e.g., the spacer 19, and the pocket 32 are formed by a forging operation). At section 64d, through-holes 15 and 31 are formed (e.g., by a punching operation). Grooves 17 are rough formed at section 64e (e.g., by a coining operation). At section 64f, the planar surfaces 63 about the grooves are flattened (e.g., by a compression operation). At section 64g, the grooves 17 are finally formed with precision. The sections 64e to 64g are designed to compensate for spring-back from stamping the relatively hard base material (e.g., Kovar). This completes the cycle for forming the structured features on the base 16. The base 16 is singulated by cutting along dotted lines 65) from the spine 62 in strip 60. The base 16 may be subject to further processing (e.g., surface finishing and/or coating, such as gold plating to improve anti-corrosion, etc.)

The singulated base 16 is turned upside down, and subject to stamping the metal insert 34 using the stamping tool 50 in FIG. 5, as described above.

The above-described embodiment is illustrative of how a basic combination of features and components defined on an optical bench can be formed by stamping operations on a single part having a composite structure, to achieve a defined optical path 100 with optical alignment at tight (i.e., small) tolerances. Other configurations achieving different optical paths may be configured, such as re-configuring prior art silicon optical benches with stamped optical benches having similar defined optical paths. A stamped optical bench could have similar overall size and configuration, and similar footprint, compared to a corresponding silicon optical bench. The stamped optical bench would be backward compatible to replace a silicon optical bench. It is conceivable that stamped optical benches could be configured to have a smaller footprint and overall size than silicon optical benches.

The above described structured features at the surface of the auxiliary portion 14 are integrally stamped from the same stock material (i.e., insert 34). Matching punches and dies having appropriate features defined thereon may be applied in a series of stamping operations to obtain the desired geometries of the above-described features of the base 16 and auxiliary portion 14. Preferably, at least the features critical to precise optical alignment are subject to a final stamping operation, by which such features are finally defined simultaneously on the same (e.g., monolithic or unitary), single auxiliary portion 14. For the illustrated embodiments, this would include at least the structured reflective surface 12, the shoulder 5 and the alignment grooves 25. These structured features may be individually preformed during a sequence of stamping operations, but they are subject to a final stamping operation using a die having a surface profile 45 that integrally and/or simultaneously defines the final geometry of the combination of these features in relationship to each other on the same (monolithic or unitary) auxiliary portion 12. By forming the structure reflective surfaces 12 and the optical fiber alignment structure/grooves 25 simultaneously in a same, single final stamping operation, dimensional relationship of all critical features/components requiring (or play a role in providing) alignment on the same work piece/part can be maintained in the final stamping step. Accordingly, optical fibers 20, with their ends 21 retained in the alignment grooves 5, have end faces that are positioned in a precise predetermined relationship to the structured reflective surface 12, thus conforming to a desired optical path 100 at least between the optical fibers 20 and the structured reflective surfaces 12 (e.g., optical path 100 shown in FIG. 1D).

In accordance with another embodiment, instead of creating an interlocking rivet-like structure between the auxiliary portion 14 and the base 16 in the above-described embodiments, the base 16 and the spacer 19 are not provided with chamfers 26 and 27, and under stamping operation the insert 34 simply forms a tight mechanical fit in the through-hole 15 in the base 16.

In a further embodiment, the auxiliary material may be fused to the base material under pressure from stamping the dissimilar material onto the base material; this can be accomplished when the base and auxiliary portions are made of chemically similar metals (e.g. two aluminum alloys). For example, an auxiliary portion may be in the form of a layer of metal (e.g., pure Aluminum), which is stamped to form structured features and at the same time fusing to an underlying base material (e.g., Aluminum 6061 alloy), to form a composite structure.

In a further embodiment, an auxiliary portion in the form of a coating (e.g., gold plating) may be pre-formed on a base material, prior to stamping the coating to form structured features on the surface of the coating.

In the above described embodiments, the auxiliary material is chosen to be malleable for shaping by stamping operations. The base material may also be chosen to be malleable for shaping by stamping. In one embodiment, the auxiliary material (e.g., pure Aluminum) is chosen to be relatively softer, and more malleable/ductile than the base material (e.g., Kovar), to obtain the desired geometries, dimensions and/or finishes of critical features (e.g., a light reflective surface) at the auxiliary portion. The harder base material (e.g., Kovar) is chosen to form structures that require the integrity of a harder material, but stamping the harder base material would require larger forces and result in more springback, requiring multiple hits of the stamping punch to obtain the desire shape. In contrast, the relatively softer auxiliary material chosen for stamping the auxiliary portion requires less stamping forces and results in less springback, requiring relatively fewer hits (e.g., just one hit) of the punch to obtain the stamped part. Hence micro features can be stamped with very small tolerances. The harder base material also functions as part of the die, which partially shapes the auxiliary portion 14 during stamping operation.

Figure 7A:
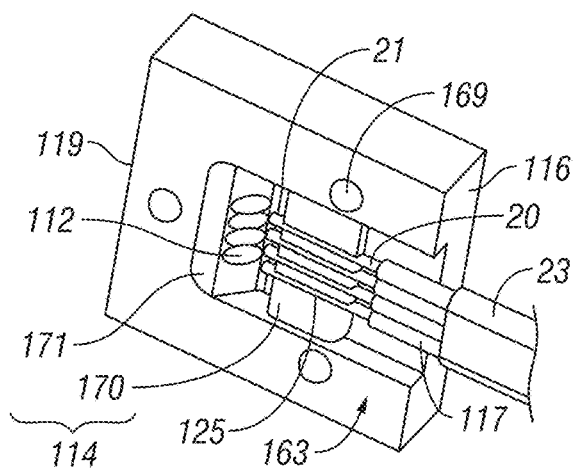
FIG. 7A is a perspective of an optical bench having a composite structure in accordance with another embodiment of the present invention.
Figure 7B:
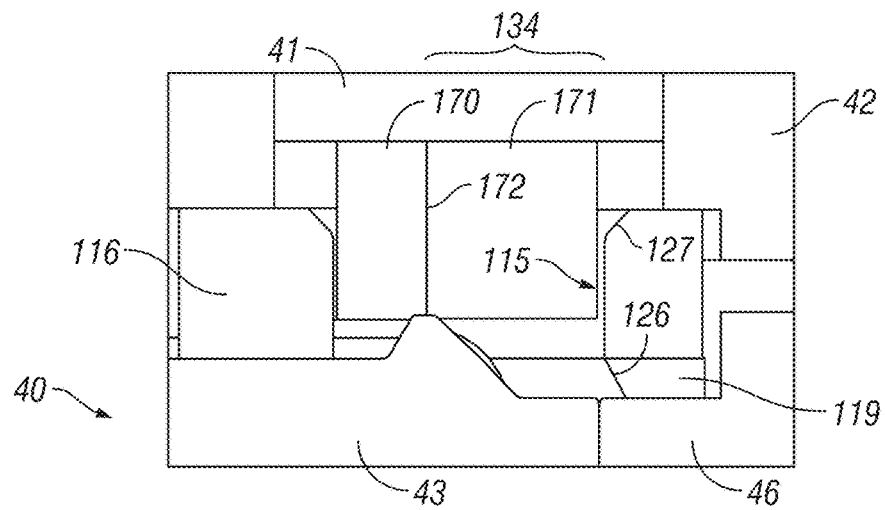
FIG. 7B schematic illustrates part of a stamping tool in accordance with one embodiment of the present invention.
Figure 7C:
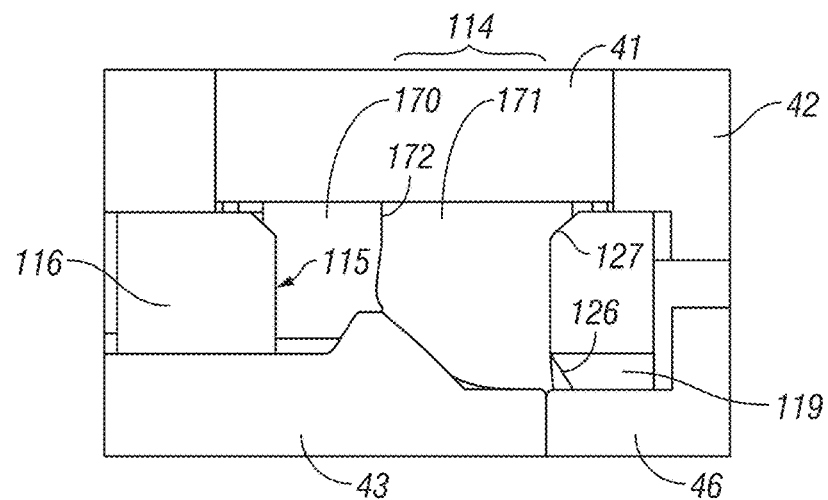
FIG. 7C is an enlarged view of the contact region in FIG. 7B.

In a further embodiment, the auxiliary portion (e.g., in the form of a slug or rivet) comprises a further composite structure comprising at least two dissimilar auxiliary materials (e.g., a bi-metallic material) associated with different properties for stamping different structured features. FIGS. 7A to 7C schematically illustrates one embodiment, in which the auxiliary portion 114 is a bi-metallic structure. In FIG. 7A, an optical bench 111 is formed by a composite structure including a base 116 and an auxiliary portion 114. This optical bench 111 supports a bundle of four optical fibers 20, which have end section 21 aligned with structured reflective surfaces 112 at the auxiliary portion 114. The base 116 is provided with grooves 117 for supporting bulk sections of the bare optical fibers 20. The general structure of this optical bench 111 is in large part similar to that of the optical bench 11 discussed in the earlier embodiment, with the exception of the auxiliary portion 114. In this embodiment, the auxiliary portion 114 is generally cylindrical with a generally rectangular cross section having rounded corners, comprising a composite structure of two dissimilar materials 170 and 171. In the views of FIGS. 7B and 7C, the interface 172 between the materials 170 and 171 is generally vertical. Further, in this embodiment, mechanical fiducial or alignment features 169 are formed on the planar surface 163 of the base 116, which facilitates alignment and/or accurate positioning the optical bench 111 with respect to an external optical component (e.g., the optical component 24 in FIG. 1D). A cover is not required in this embodiment (compared to cover 18 in the embodiment of FIGS. 1A to 1D).

FIG. 7B shows a slug or insert 134 prior to being subject to stamping operation, in a stamping tool 40 discussed above in reference to FIGS. 3A to 3C, which may be part of the stamping tool 50 discussed above in reference to FIGS. 5A to 5C.

Upon stamping, as shown in FIG. 7C, the dissimilar materials of the insert 134 are pressed to plastically deform to conform to the profile 45 of the die 43 and the chamfer 126 of the spacer 119 and the chamfer 127 of the through-hole 115 in the base 116. The material 170 corresponds to the region where the grooves 125 are formed by stamping operation, and the material 171 corresponds to the region where the structured reflective surfaces 212 are formed by stamping operation. Both materials 170 and 171 are stamped in the same stamping operation, to form the structured features on both materials 170 and 171 substantially simultaneously.

In one embodiment, the material 170 could be an Aluminum alloy and the material 171 could be pure Aluminum. Aluminum alloy is a relatively harder material compared to pure Aluminum, which therefore result in a structure that possesses better structural integrity for aligning the optic fiber 20. Pure Aluminum, on the other hand, is chosen for its high optical reflectance. The material of the base 116 could be Kovar, selected for its strength, hardness, low coefficient of thermal expansion and glass matching characteristics for a glass sealant to achieve a hermetic seal.

Accordingly, in the embodiment of FIGS. 7A to 7C, the optical bench 111 can achieve further improved properties by using a composite structure comprising three dissimilar materials, with each material optimized for the particular structures, functions and properties desired of different parts of the optical bench 111.

Figure 8A:
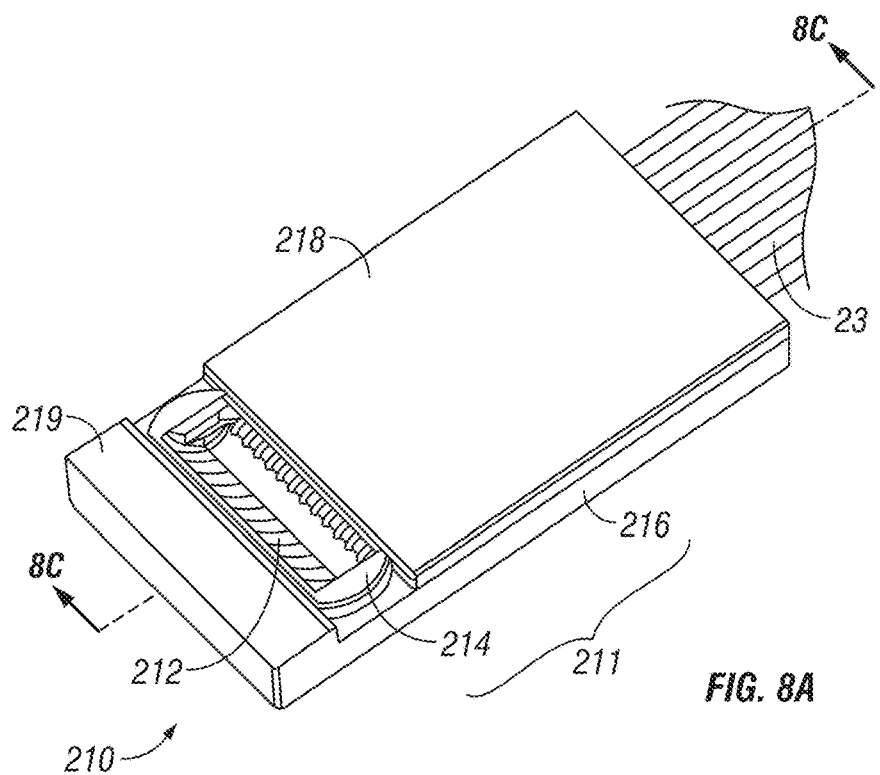
FIG. 8A illustrates an optical coupling device having a stamped optical bench with a composite structure in accordance with a further embodiment of the present invention.
Figure 8B:
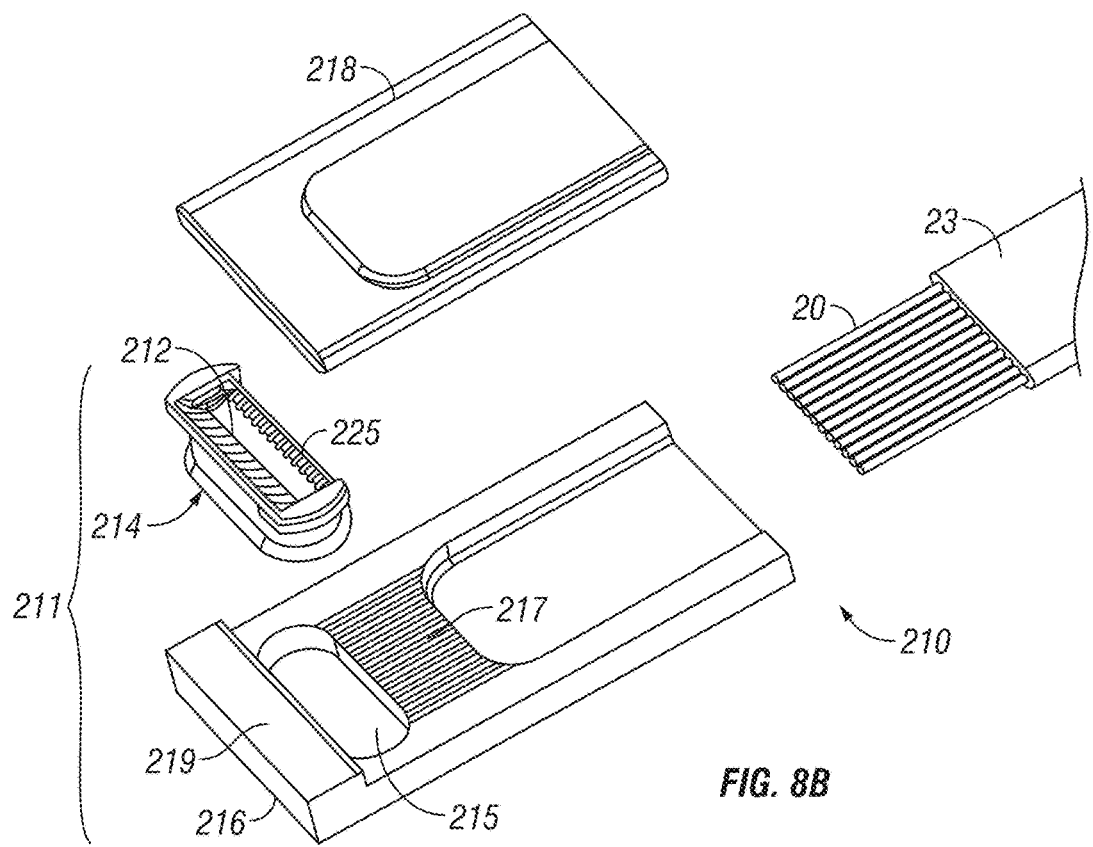
FIG. 8B is an exploded view thereof.
Figure 8C:
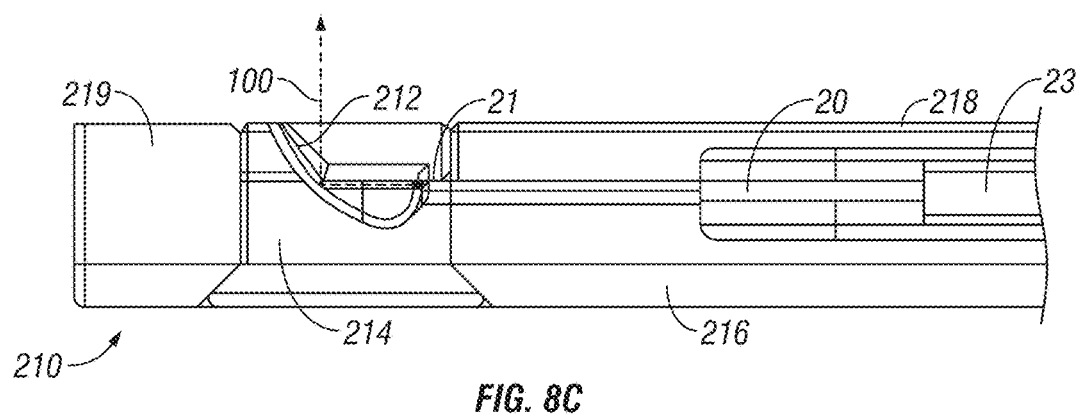
FIG. 8C is a sectional view taken alone line 8C-8C in FIG. 8A.

FIGS. 8A to 8C illustrate another embodiment of an optical coupling device 210 for supporting a larger number (e.g., twelve) of optical fibers, which can be formed by stamping a composite structure as above. The optical bench 211 includes a composite structure comprising a base 216 and an auxiliary portion 214 of dissimilar materials. The base 216 is provided a through-hole 215 shaped for coupling the auxiliary portion 214. In this embodiment, the spacer 219 is an integral part of the base 216. A cover 218 is provided. The auxiliary portion 214 has a body that is generally cylindrical with a generally stretched oval cross section, which is shaped to define structured reflective surface 212, and grooves 225 for aligning the end sections 21 of the optical fibers 20 with respect to the structured reflective surfaces 212. The auxiliary portion 214 may comprise a first type of auxiliary material for stamping the structured reflective surface and a dissimilar second type of auxiliary material for stamping the structured features for alignment, as in the case of the embodiment of FIG. 7 discussed above. The base 216 is shaped to define less dimensionally critical structured features, such as grooves 217 for retaining bulk sections of the bare optical fibers 20 without optical alignment concern.

While the foregoing embodiments are described in connection with composite structures having dissimilar metal materials, it is possible to form composite structure in accordance with the present invention to include the following: (a) a metal auxiliary material and a metal base material; (b) a metal auxiliary material and a non-metal base material; and (c) a non-metal auxiliary material and a metal base material. For example, the base may be made of a ceramic material, and the auxiliary portion made of a metal. The auxiliary portion can be stamped and pressed from a relatively soft and ductile metal insert inserted into the ceramic base. The ductile insert in the brittle ceramic body can be stamped and formed to obtain precise, detail surface features, including reflective optics. Thus reflective optics can be easily achieved in a ceramic substrate. Alternatively, an over molded polymer on a base may be stamped to form desired surface features.

In another embodiment, the dissimilar auxiliary portion may be attached to the base by other means (e.g., bonding, welding, riveting, etc.), prior to subjecting the auxiliary portion to stamping operation(s).

While the above embodiments are discussed in connection with optical fibers as optical components, optical benches having a composited structure may be structured to support and optically align other types of optical components, such as lenses, optical transmitters (Tx), optical receivers (Rx), optical transceivers (Tx/Rx), etc.

The present invention can be implemented to precisely form structured features in various devices, such as those disclosed in the patent documents assigned to nanoPrecision Products, Inc. which have been discussed in the Background section herein. The present invention can be implemented to produce optical subassemblies and stamped optical benches having structured features that achieve or exceed the functionalities of prior art silicon optical benches, such as those discussed in US2003/223131A1; U.S. Pat. Nos. 6,869,231; 8,103,140; and 8,168,939.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A method of forming a composite structure having structured features defined thereon to define an optical path in connection with optical transmissions, comprising:
   providing a base comprising a body of a first material defined between a top surface and a bottom surface, wherein the base is provided with a top opening at the top surface, a bottom opening at the bottom surface, and a through hole extending through the body from the top opening at the top surface to the bottom opening at the bottom surface of the body;
   positioning a second material in the through hole provided in the base, wherein the second material is dissimilar to the first material; and
   stamping the second material to structurally couple the second material to the base and to define a first structured feature on the second material, thereby forming the composite structure comprising the base of the first material and an auxiliary portion from the second material with the first structured feature defined thereon, and
   wherein the first structured feature defines an optical path in connection with optical transmissions.

2. The method of claim 1, wherein stamping the second material plastically deforms the second material at the bottom opening to expand to wider than the through hole so as to form an interlocking structure to lock the auxiliary portion to the base.

3. The method of claim 1, wherein the first structured feature comprises an optical element formed by stamping the second material.

4. The method of claim 3, wherein the optical element comprises a structure reflective surface formed by stamping the second material.

5. The method of claim 4, wherein the structured reflective surface comprises a concave reflective surface.

6. The method of claim 3, wherein the first structured feature further comprises a first alignment structure to facilitate positioning an optical component in optical alignment with the optical element along the optical path.

7. The method of claim 6, wherein the optical component comprises an optical fiber, and the first alignment structure defines a groove for retaining the optical fiber in alignment with the optical element.

8. The method of claim 1, further comprising forming a second structured feature on the base in optical alignment with the first structure feature defined on the auxiliary portion.

9. The method of claim 8, wherein the second structured feature comprises a second alignment structure to facilitate positioning an optical component in optical alignment with the first structured feature along the optical path.

10. The method of claim 9, wherein the optical component comprises an optical fiber, and the second alignment structure defines a groove for retaining the optical fiber in alignment with the optical element.

11. The method of claim 8, wherein the second structure feature is formed on the base before positioning the second material in the through hole.

12. The method of claim 11, wherein the second structured feature is formed by stamping the base.

13. The method of claim 1, wherein the second material includes a first dissimilar material and a second dissimilar material.

14. The method of claim 13, wherein the first structured feature comprises a first feature and a second feature, and wherein stamping the second material comprises stamping the first dissimilar material to form the first feature with the first dissimilar material and stamping the second dissimilar material to form the second feature.

15. The method of claim 14, wherein stamping the second material comprises stamping the first and second dissimilar materials in a same stamping operation to form the first feature with the first dissimilar material and the second feature with the second dissimilar material.

16. The method of claim 14, wherein the first feature comprises an optical element formed by stamping the first dissimilar material, and the second feature comprises an alignment structure to facilitate positioning an optical component in optical alignment with the optical element along the optical path.

17. The method of claim 1, wherein the first material is relatively harder than the second material.

18. The method of claim 17, wherein the first material is a first metal and the second material is a second metal.

19. A stamped optical bench formed by the method of claim 1.

* * * * *